United States Patent
Colotte et al.

(10) Patent No.: US 9,463,402 B2
(45) Date of Patent: Oct. 11, 2016

(54) DETECTING THE CLOGGING OF A FLUID FILTER

(75) Inventors: Baptiste Benoit Colotte, Melun (FR); Valerio Gerez, Yerres (FR); Gilles Claude Gabriel Massot, Voisenon (FR)

(73) Assignee: SNECMA, Paris (FR)

( * ) Notice: Subject to any disclaimer, the term of this patent is extended or adjusted under 35 U.S.C. 154(b) by 2164 days.

(21) Appl. No.: 12/364,754

(22) Filed: Feb. 3, 2009

(65) Prior Publication Data

US 2009/0194485 A1    Aug. 6, 2009

(30) Foreign Application Priority Data

Feb. 6, 2008  (FR) ..................... 08 50744

(51) Int. Cl.
*B01D 37/04*      (2006.01)
*B01D 35/143*     (2006.01)

(52) U.S. Cl.
CPC ........... *B01D 37/046* (2013.01); *B01D 35/143* (2013.01)

(58) Field of Classification Search
None
See application file for complete search history.

(56) References Cited

U.S. PATENT DOCUMENTS

| 4,932,205 A | 6/1990 | Alderfer et al. | |
| 6,402,954 B1* | 6/2002 | O'Keefe, Jr. | 210/636 |
| 2002/0060191 A1* | 5/2002 | Sutton et al. | 210/741 |

FOREIGN PATENT DOCUMENTS

| AT | 392 158 B | 2/1991 |
| EP | 0 337 851 A1 | 10/1989 |
| GB | 2 278 295 A | 11/1994 |

\* cited by examiner

*Primary Examiner* — Allison Fitzsimmons
(74) *Attorney, Agent, or Firm* — Oblon, McClelland, Maier & Neustadt, L.L.P.

(57) ABSTRACT

A method of detecting clogging of a fluid filter is disclosed. The method includes measuring, at successive sampling instants, the pressure difference $\Delta P$ from upstream to downstream across the filter, calculating the first time derivative $\{\Delta P\}'$ of the pressure difference $\Delta P$ at different instants, and sending a clogging signal $S_c$ representative of the filter being clogged when the first derivative $\{\Delta P\}'$ is equal to zero.

6 Claims, 2 Drawing Sheets

DETECTING THE CLOGGING OF A FLUID FILTER

FIELD OF THE INVENTION

The present invention relates to the field of fluid filters. More particularly, the invention relates to a method and a device for detecting the clogging of a fluid filter.

BACKGROUND OF THE INVENTION

A fluid circuit is generally fitted with a filter that serves to filter the fluid, i.e. to remove impurities and residues therefrom that might otherwise damage the equipment in which the fluid flows. By way of example the fluid may be a lubricant such as oil, or it may be a fuel.

In use, by recovering such impurities and residues, the filter clogs up progressively, and ends up preventing fluid from passing through the filter. In order to avoid that situation, the branch of the fluid circuit having the filter mounted therein includes a bypass circuit in parallel. This configuration is shown in FIG. 1, which shows the state of the art. In the description below, the terms "upstream" and "downstream" are defined relative to the normal flow direction of the fluid in the circuit. The filter 20 is mounted in a main branch 10 of a fluid circuit. Upstream from the filter, the main branch 10 splits into two branches, a first branch 12 extending the main branch 10 and having the filter 20 mounted therein, and a second branch 14 having a check valve device 40 mounted therein (a "bypass" device). Downstream from the bypass device 40, the second branch 14 rejoins the first branch 12 downstream from the filter 20 so as to reform the main branch 10, such that the bypass device 40 is mounted in parallel with the filter 20. Consequently, the fluid pressure upstream from the bypass device 40 is substantially equal to the pressure P upstream from the filter 20. In FIG. 1, the fluid flows from left to right, as represented by arrow F.

When the filter is not clogged with impurities, i.e. at the beginning of its operation, the pressure $P_f$ immediately downstream from the filter 20 (in the first branch 12) is substantially equal to the pressure P upstream from the filter 20. Similarly, the pressure $P_{dc}$ immediately downstream from the bypass device 40 (in the second branch 14) is substantially equal to the pressure P upstream from the bypass device 40. All of the fluid flows in the branch 12, and the fluid in the upstream portion of the branch 14 is blocked by the bypass device 40. This bypass device 40 behaves like a valve that allows fluid to pass only when the pressure difference $\Delta P = P - P_{dc}$ from upstream to downstream across the bypass device 40 is greater than a critical value $\Delta P_C$. Such a bypass device 40 is known in the prior art. For example it may be a device comprising a ball valve, operating in the manner recalled briefly above.

A device with a ball valve comprises a container containing a ball and a spring. When the ball valve device is in its closed position, the ball is urged by the spring to block the upstream end of the container and thereby prevents the fluid in the portion of the branch situated upstream from the container from penetrating therein. When the pressure of the fluid upstream from the container increases relative to the pressure of the fluid downstream from the container, the force exerted by said fluid by the ball, and thus against the spring, increases in proportion. At a certain critical value $\Delta P_C$ for the pressure difference between upstream and downstream of the ball valve device, the reaction force from the spring is exactly counterbalanced by the force generated by the pressure $\Delta P_C$ on the ball. When this pressure exceeds the critical value $\Delta P_C$, the ball is pushed downstream and thus allows the fluid to pass through the ball valve device, which is then in its open position.

It will be understood that as the filter 20 becomes clogged as a result of impurities accumulating thereon, the upstream to downstream pressure difference $\Delta P = P - P_f$ across the filter 20 increases. The pressure difference across the bypass device 40 also increases since this difference is substantially equal to the pressure difference across the filter, since the first branch 12 including the filter 20 and the second branch 14 including the bypass device are in parallel. The bypass device 40 is calibrated in such a manner as to switch to its open position when the filter 20 becomes completely clogged. Thus, the critical value $\Delta P_C$ is referred to as the clogging value (or the "clogging pressure difference").

Once the filter 20 is completely clogged, the fluid thus passes via the second branch 14 of the circuit, through the bypass device 40, and is therefore no longer filtered. The fluid therefore continues to reach the downstream mechanism for which it is intended (e.g. an engine if the fluid is a fuel, a ball bearing or any other moving part if the fluid is an oil), but it does so filled with impurities. The impurities run the risk of damaging the mechanism, and in practice it is therefore essential to replace the filter 20 before it becomes completely clogged.

That is why the filter 20 is used in association with a pressure detector that informs the user (e.g. the pilot) that the filter 20 is about to become clogged and needs to be replaced quickly. FIG. 1, showing the prior art, shows one such detector 60. The detector 60 is mounted in a third branch 16 that is connected to the first branch 12 on either side of the filter 20. The detector 60 is a device that is known in the prior art (e.g. it is of the pressure contact type) and its structure is not described in detail here. It operates on the following principle: when the pressure difference $\Delta P_m$ across the detector 60 reaches a threshold value $\Delta P_S$, the pressure contact sends a signal (typically an electrical signal) to the user to inform the user that the pressure difference $\Delta P_m$ across the detector 60 has crossed the threshold value $\Delta P_S$. The threshold value $\Delta P_S$ is selected to be less than the clogging critical value $\Delta P_C$ (e.g. 90% of said critical value). Thus, when the signal coming from the detector 60 is received by the user, the user knows that the filter 20 needs to be replaced soon, and sufficient time remains for the replacement to take place before the filter 20 becomes completely clogged. This information is passed on to the maintenance crew who perform the change in good time during a subsequent maintenance operation.

When the filter 20 is still not completely clogged, merely replacing the filter suffices prior to putting the circuit back into operation. However, it can happen that the maintenance crew performs this maintenance operation late, possibly after the filter 20 has become completely clogged. Under such circumstances, the filter 20 will have been bypassed and fluid will have continued to flow in the circuit, taking impurities through the bypass device 40 into the entire circuit downstream from the filter 20. Under such circumstances, it is essential for the circuit to be inspected exhaustively and cleaned, which operations are much more burdensome than replacing a filter. When the maintenance crew are performing a maintenance operation, it is therefore necessary for them to know whether or not the filter has already become clogged and has been bypassed.

That is why the portion of the second branch 14 that is situated downstream from the bypass device 40 is provided with a visual indicator 70 (see FIG. 1) that shows whether the fluid has flowed in the downstream portion of the second branch 14, i.e. whether the fluid has passed through the bypass device 40. The visual indicator 70 reveals such passage of fluid when the bypass device 40 is inspected visually. The visual indicator 70 may, for example, be a pop-up type indicator, i.e. it has a tongue that is initially contained inside the visual indicator 70 (the tongue is therefore not visible from the outside). Such a visual indicator 70 is known in the prior art and its operation is not described in detail herein. When the fluid passes through the portion of the second branch 14 that is situated downstream from the bypass device 40 and where the visual indicator 70 is located, the visual indicator 70 causes the tongue to move so that it can be seen by the maintenance crew. Thus on looking at the bypass device 40 (and its visual indicator 70), the crew can tell immediately whether the filter 20 has become clogged and whether or not it has been bypassed.

That clogging detection system associated with the filter 20 nevertheless presents the drawback that it is necessary to inspect the visual indicator 70 in order to know whether the filter has become completely clogged or has been clogged only partially.

OBJECT AND SUMMARY OF THE INVENTION

The invention seeks to propose a method of detecting the clogging of a filter that makes it possible to eliminate the need to use the visual indicator and to inspect it when performing a maintenance operation.

This object is achieved by the fact that the method of detecting clogging of the filter comprises measuring, at successive sampling instants, the pressure difference $\Delta P$ from upstream to downstream across the filter, then calculating at different instants the first time derivative $\{\Delta P\}'$ of the pressure difference $\Delta P$, and then sending a clogging signal Sc representative of the filter being clogged when the first derivative $\{\Delta P\}'$ is equal to zero.

By means of these provisions, the user (e.g. the pilot of the airplane if the filter is in a circuit of a turbojet) and the maintenance crew are informed that the filter is clogged. When the filter is completely clogged, the pressure difference $\Delta P$ across the filter becomes constant and remains constant. The first derivative $\{\Delta P\}'$ of the pressure difference $\Delta P$ then becomes zero and the clogging signal $S_C$ is sent.

Advantageously, prior to sending the clogging signal $S_C$, the method includes sending a threshold signal Ss when the pressure difference $\Delta P$ exceeds a threshold value $\Delta P_S$ less than the pressure difference $\Delta P_C$ corresponding to the filter being clogged.

Thus, a single sensor is used for detecting both crossing the threshold value $\Delta P$, and crossing the clogging value $\Delta P_C$ that indicates that the filter is completely clogged, instead of using a detector and a visual indicator. This reduces costs both on purchase, and during maintenance of the filter, as explained above. The user and the maintenance crew are informed both of the fact that the filter is partially clogged beyond a level corresponding to the threshold value, and that the fact the filter is or is not completely clogged, without it being necessary to inspect the visual indicator.

The invention also provides a detector device for detecting clogging of a fluid filter, the device being mounted on a circuit for said fluid.

According to the invention, the detector device comprises: a sensor connected to the circuit upstream and downstream from the filter, and suitable for measuring, at successive sampling instants, the upstream to downstream pressure difference $\Delta P$ across the filter; and a processor suitable for calculating at different instants the first time derivative $\{\Delta P\}'$ of the pressure difference $\Delta P$, and suitable for sending a clogging signal $S_C$ representative of clogging of the filter when the first derivative $\{\Delta P\}'$ is equal to zero.

Advantageously, prior to sending the clogging signal $S_C$, the processor is suitable for sending a threshold signal Ss when the pressure difference $\Delta P$ exceeds a threshold value $\Delta P_S$ less than the clogging pressure difference $\Delta P_C$ corresponding to the filter being clogged.

BRIEF DESCRIPTION OF THE DRAWINGS

The invention can be better understood and its advantages appear more clearly on reading the following detailed description of an embodiment given by way of non-limiting example. The description refers to the accompanying drawings, in which.

MORE DETAILED DESCRIPTION

Figure 1:
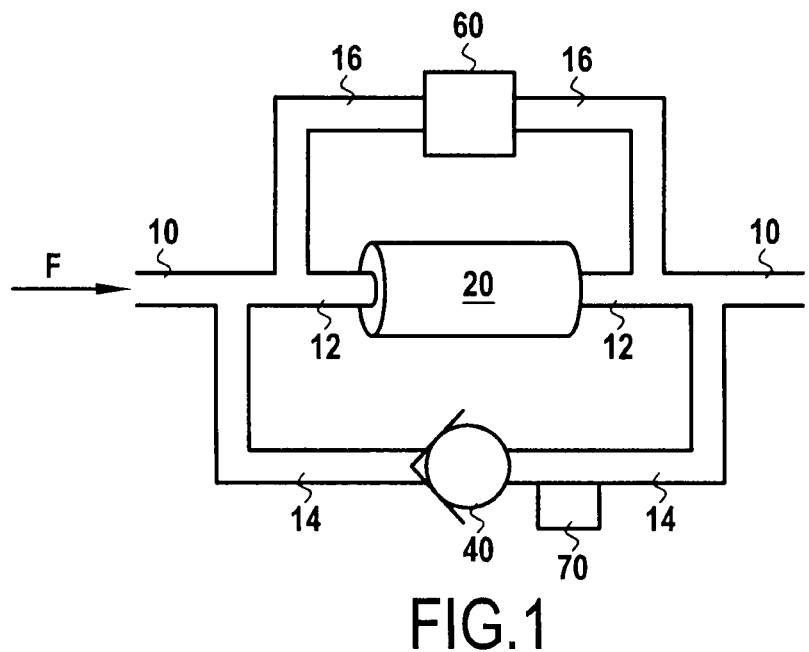
FIG. 1 is a diagram of a prior art filter and method for detecting clogging of the filter.
Figure 2:
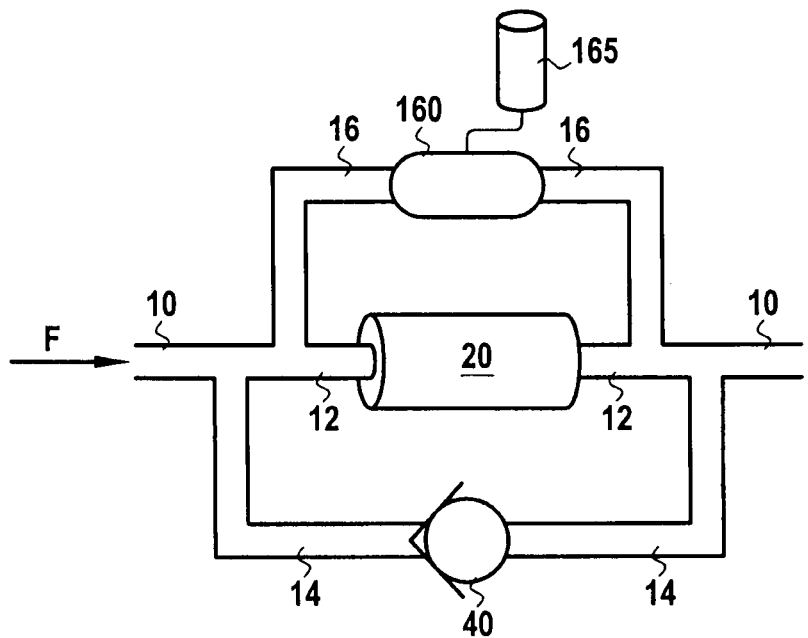
FIG. 2 is a diagram of a filter of the invention and of the method of the invention for detecting clogging of the filter.

FIG. 2 shows a filter 20 mounted in a main branch 10 of a fluid circuit. By way of example, the filter 20 may be mounted in a fluid circuit of a turbomachine. The fluid may be constituted, for example, by a lubricant such as oil, or by a fuel. Upstream from the filter 20, the main branch 10 splits into two branches, a first branch 12 that extends the main branch 10 and that has the filter 20 mounted therein, and a second branch 14 that has a bypass device 40 mounted therein. Downstream from the bypass device 40, the second branch 14 rejoins the first branch 12 downstream from the filter 20 so as to reform the main branch 10, so that the bypass device 40 is mounted in parallel with the filter 20. In FIG. 2, the fluid flows from left to right as represented by the arrow F.

A sensor 160 is connected to the first branch 12 containing the filter 20, on either side of the filter 20. Thus, a third branch 16 of the fluid circuit connects the first branch 12 upstream from the filter 20 to the second branch 12 downstream from the filter 20 via the sensor 160, which is mounted in said third branch 16. The connection of the third branch 16 upstream from the filter 20 is thus located downstream from the connection of the second branch 14 that is upstream from the filter 20, and the connection of the third branch 16 downstream from the filter 20 is thus located upstream from the connection of the second branch 14 that is downstream from the filter 20. It would also be possible to connect the third branch 16 to the main branch 10 upstream from the filter 20 and upstream from the location where the second branch 14 is connected to said main branch 10, and to connect the third branch 16 to the main branch 10 downstream from the filter 20 downstream from the location where the second branch 14 is connected to said main branch 10. Whatever the configuration, the first branch 12 including the filter 20 and the third branch 16 including the sensor 160 are in parallel, and the pressure difference across the ends of the sensor 160 is substantially equal to the pressure difference $\Delta P$ (head loss) across the ends of the filter 20. The solution shown in FIG. 2 (the third branch 16 in parallel with the first branch 12, i.e. closer to the ends of the filter 20) is preferable since the pressure difference measured by the sensor 160 is then closer to the pressure difference ΔP across the ends of the filter, given that the head loss due to the length of the branches in the circuit has no influence on the measurement. The sensor 160 is also connected to a processor 165 capable of processing a signal, typically an electrical signal. The sensor 160 is a device that is known in the prior art, as is the processor 165 associated therewith. Their structures are therefore are not described in detail below.

Figure 3:
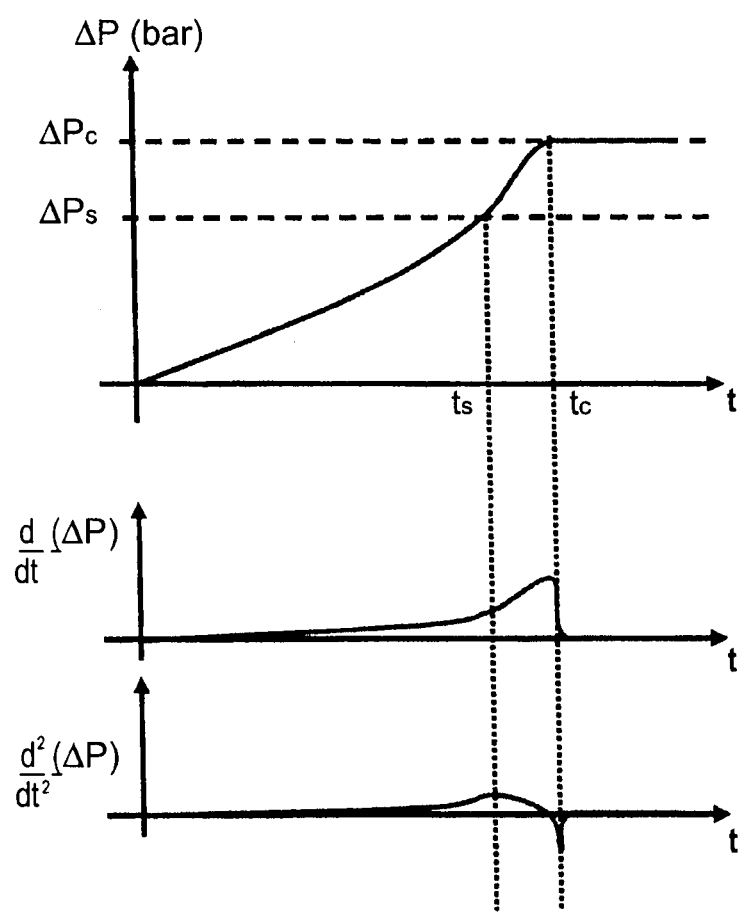
FIG. 3 is a graph showing the variation over time in the pressure difference $\Delta P$ across the filter, the variation in the first derivative of said pressure difference $\Delta P$, and the variation in the second derivative of said pressure difference $\Delta P$.

The sensor 160 is suitable for continuously measuring the pressure difference ΔP across the filter 20 in the third branch 16. Thus, the pressure difference ΔP is measured at successive time intervals, these instants at which the measurement is taken constituting sampling over time. Ideally, these intervals are substantially regular, and the instants at which the measurement is taken are sufficiently close together to reproduce reliably the variations over time in the pressure difference ΔP. This variation in the difference ΔP is shown in FIG. 3. The pressure difference ΔP increases continuously from zero up to a value $\Delta P_C$ corresponding to the filter 20 being completely clogged and to the bypass device 40 opening and allowing fluid to pass therethrough in the second branch 14. Once the filter 20 has become clogged, the difference ΔP remains constant and equal to the clogging value $\Delta P_C$.

The sensor 160 sends a threshold signal Ss (typically an electrical signal) to the user (e.g. the pilot) when the pressure difference ΔP across the sensor 160 (i.e. across the filter 20) reaches a threshold value $\Delta P_S$, i.e. at the instant $t_S$ in FIG. 3 (or the measurement instant immediately following $t_S$). The threshold value $\Delta P_S$ is selected to be less than the clogging value APE, as shown in FIG. 3 (e.g. 90% of said critical value). Thus, when the signal coming from the sensor 160 is received by the user, the user knows that the filter 20 needs to be replaced soon. This information is forwarded to the ground crew who then perform this replacement in good time during a subsequent maintenance operation.

In addition, because the pressure difference ΔP is measured continuously by sampling, the processor 165 can make use of this continuous measurement for calculating, at least each sampling instant, or at a plurality of said instants, the derivative $$\frac{d}{dt}(\Delta P)$$

of the pressure difference ΔP relative to time (this derivative is the derivative of the measurement signal delivered by the sensor 160 to the processor 165, the measurement signal being proportional to the pressure difference ΔP). This first derivative is written {ΔP}'. Thus, the derivative $$\frac{d}{dt}(\Delta P)$$

is calculated at an arbitrary instant $t_1$ (written $$\frac{d}{dt}(\Delta P)\bigg]_1$$

or $\{\Delta P\}_1$) can be calculated, e.g. by using two measurements $\Delta P_1$ and $\Delta P_2$ of the pressure difference ΔP at the instant $t_1$ and at the following instant $t_2$ by applying the following formula:

$$\frac{d}{dt}(\Delta P)\bigg]_1 = \frac{\Delta P_2 - \Delta P_1}{t_2 - t_1} \quad (I)$$

The closer together the instants $t_1$ and $t_2$, the more accurate the calculation of the derivative. Ideally, the instants $t_1$ and $t_2$ are therefore selected to be two successive sampling instants. This therefore produces a continuous measurement of the derivative {ΔP}' of the pressure difference across the filter 20.

When the filter 20 is completely clogged (i.e. at instant $t_c$ in FIG. 3), the pressure difference ΔP across the filter 20 becomes constant and remains constant (prior to the filter becoming clogged, the pressure difference increases over time, so its derivative is strictly positive). The derivative {ΔP}' of the pressure difference then becomes zero, as shown in FIG. 3, which plots variation in the derivative {ΔP}' as a function of time. When the derivative {ΔP}' becomes zero (i.e. at a measurement instant equal to or immediately greater than $t_c$), the processor 165 sends a clogging signal $S_C$ to the user who is then informed that the filter 20 has become completely clogged.

Thus, by using a single sensor (the sensor 160) and a processor 165, it is possible to inform the user (and thus the maintenance crew) that the filter 20 is clogged either partially or completely, without it being necessary to use a visual indicator on the bypass device 40.

The processor 165 may be incorporated in the sensor 160 or it may be separate therefrom. Under such circumstances, the processor 165 may be included in the engine monitoring unit (EMU) or in the airplane maintenance unit.

In order to confirm the fact that the filter is completely clogged, it is possible to configure the processor 165 so that the clogging signal $S_c$ is delivered only when the first derivative {ΔP}' is equal to zero on at least two successive instants. The processor 165 could calculate a first derivative of zero in error, or the calculation could take place at the extremum of a fluctuation in the pressure difference ΔP (and thus give a first derivative that is zero). The probability of such an error occurring at two distinct instants is minimal, so it then becomes certain that the filter is completely clogged if the first derivative {ΔP}' is equal to zero at two successive instants (e.g. at two successive sampling instants).

It is also possible to confirm the fact that the filter is completely clogged by calculating the second derivative $$\frac{d^2}{dt^2}(\Delta P)$$

of the pressure difference ΔP. When the first derivative is zero over a time interval of non-zero duration (and not just at a single point), the second derivative is zero over that interval. Thus, by using the processor 165 to calculate both the first derivative {ΔP}' of the pressure difference ΔP at a given instant $t_1$ and its second derivative (written {ΔP}") at said instant $t_1$, it is possible to ensure that the pressure difference ΔP is constant over a time interval around the instant $t_1$. In present circumstances, this means that the pressure difference ΔP is constant at all times greater than $t_1$, and thus that the filter 20 is completely clogged. It can be seen in FIG. 3 that the second derivative of the pressure difference ΔP is zero at all times $\underline{t}$ greater than the instant $t_c$ when the filter becomes completely clogged. The second derivative {ΔP}" at an arbitrary instant $t_1$ (written $$\left. \frac{d^2}{dt^2}(\Delta P) \right]_1$$

or ${\{\Delta P\}''}_1$) can be calculated, e.g. by using two measurements $\Delta P_1$ and $\Delta P_2$ of the pressure difference at the instant $t_1$ and at the following instant $t_2$ (e.g. the sampling instant following the instant $t_1$), and by applying the following formula together with formula (I):

$$\left. \frac{d^2}{dt^2}(\Delta P) \right]_1 = \frac{\left. \frac{d}{dt}(\Delta P) \right]_2 - \left. \frac{d}{dt}(\Delta P) \right]_1}{t_2 - t_1} \quad (II)$$

Thus, in order to confirm that the filter is completely clogged, it is possible to configure the processor 165 to calculate the second time derivative {ΔP}" of the pressure difference ΔP at different instants, and for the clogging signal $S_C$ to be sent to the user only when the second derivative {ΔP}" and the first derivative {ΔP}¹ are equal to zero. This situation can only happen at instants that are later than the clogging instant $t_c$, so it is certain that the filter is completely clogged.

Alternatively, given that when the first derivative is zero over a time interval of non-zero length, the derivative of order N (where N is greater than 2) is zero over said interval, and by calculating at a given instant $t_1$, simultaneously the first derivative {ΔP}' of the pressure difference ΔP and its $N^{th}$ order derivative (written {ΔP}N), it is possible to ensure that the pressure difference ΔP is constant at any instant greater than $t_1$, and thus that the filter 20 is completely clogged. Calculation of the $N^{th}$ order derivative is trivial by iterating the formula (II).

The invention also provides a device for detecting clogging of the filter 20, the device comprising a sensor 160 and a processor 165 operating as stated above.

What is claimed is:

1. A method of detecting the clogging of a fluid filter, wherein the method comprises the following steps:
   mounting a bypass device in parallel with said filter, the device allowing the fluid to pass only when the upstream to downstream pressure difference across the bypass device is greater than a critical value $\Delta P_c$ corresponding to the filter clogging;
   measuring, at successive sampling instants, the upstream to down stream pressure difference ΔP across said filter;
   calculating, at different instants, the first time derivative {ΔP}' of said pressure difference ΔP; and
   sending a clogging signal $S_c$ representative of said filter clogging when said first derivative {ΔP}' is equal to zero.

2. A method according to claim 1, wherein, prior to sending the clogging signal $S_c$, the method includes sending a threshold signal $S_s$ when said pressure difference ΔP exceeds a threshold value $\Delta P_s$ less than the pressure difference $\Delta P_c$ corresponding to said filter becoming clogged.

3. A method according to claim 1, wherein said clogging signal $S_c$ is sent only when said first derivative {ΔP}' of the pressure difference is equal to zero at at least two successive instants.

4. A method according to claim 1, further including calculating, at different instants, the second time derivative {ΔP}" of said pressure difference ΔP, said clogging signal $S_c$ being sent only when said second derivative {ΔP}" and said first derivative {ΔP}' are equal to zero.

5. A method according to claim 1, wherein said filter is an oil filter or a fuel filter.

6. A method according to claim 1, wherein said filter is mounted in a fluid circuit of a turbomachine.

* * * * *